Figure 6:
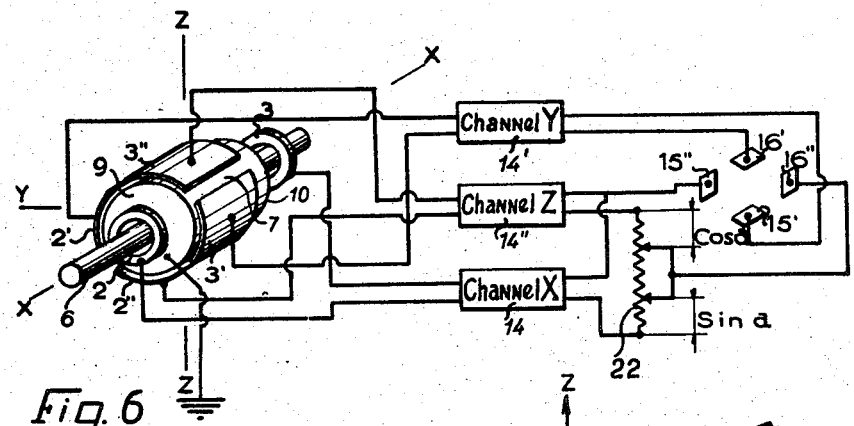

June 23, 1959     P. BUISSON     2,892,152
SYSTEM FOR MEASURING SMALL DISPLACEMENTS OF
A BODY ALONG THREE CO-ORDINATE AXES
Filed Sept. 15, 1954     4 Sheets-Sheet 1
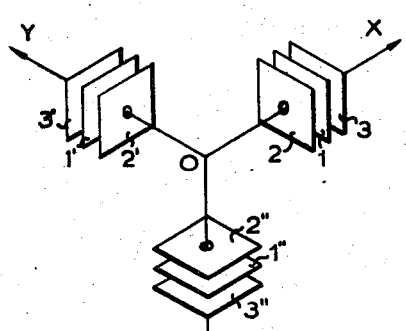
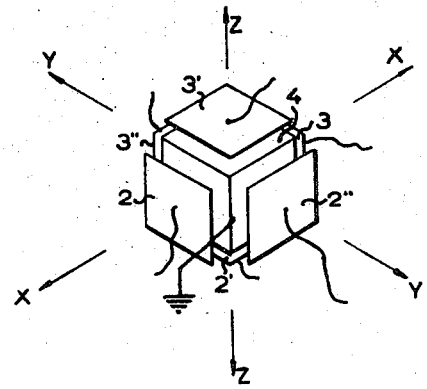
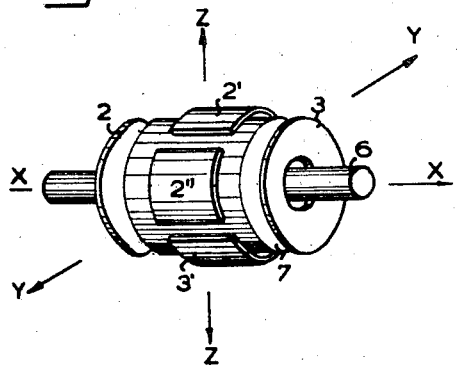
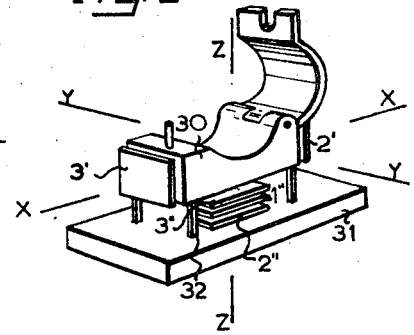
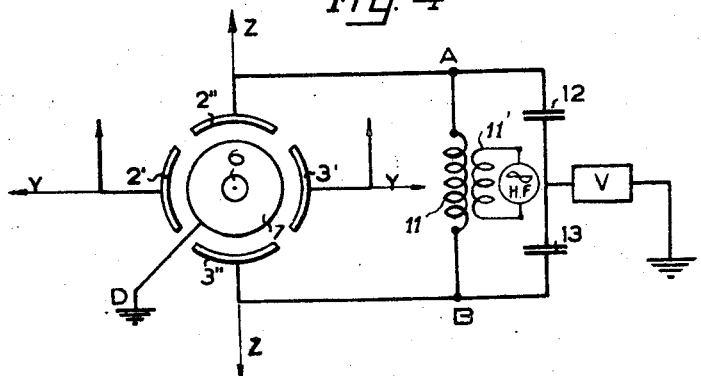
Inventor
P. Buisson

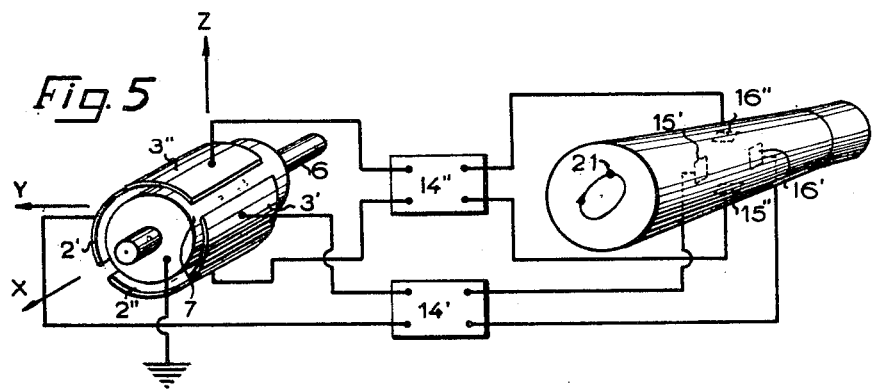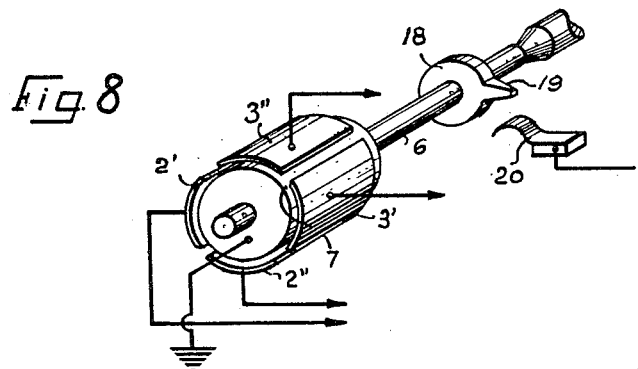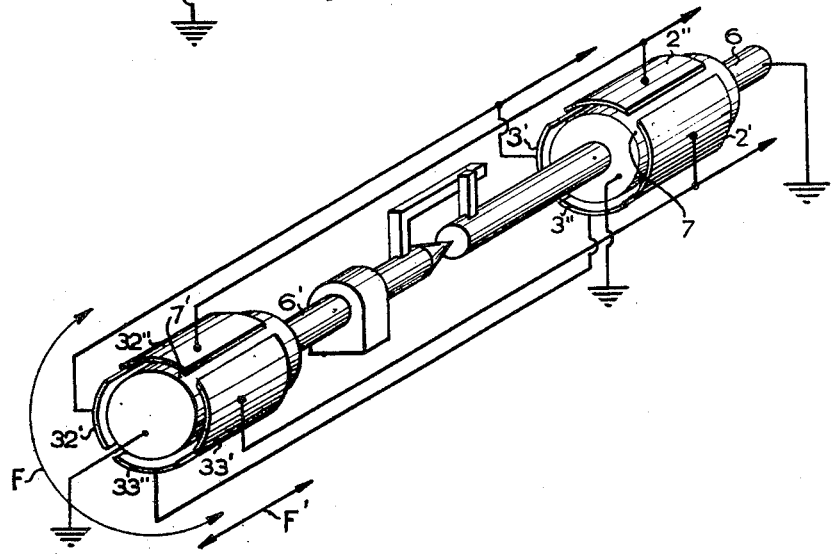

Inventor
P. Buisson

2,892,152

United States Patent Office

2,892,152
Patented June 23, 1959

2,892,152

SYSTEM FOR MEASURING SMALL DISPLACEMENTS OF A BODY ALONG THREE COORDINATE AXES

Pierre Buisson, Vanves, France

Application September 15, 1954, Serial No. 456,231

Claims priority, application France September 22, 1953

6 Claims. (Cl. 324—61)

The present invention relates to a method of and apparatus for the measurement and/or indication of displacements of a point of a material element with respect to a system of two or three co-ordinate axes. The material element may be a moving part or a vibrating member, and the system may be used, for example, to determine deformations due to dynamic effects or to exterior stresses applied to the member in motion or to measure vibration, both in direction and amplitude.

In order to measure the displacements or the deformation of a member at rest, with respect to two or three co-ordinate axes, for example at right angles to each other, two or three comparators or gauges may be employed. If the member is in motion, however (for example a shaft which rotates rapidly and which vibrates), this method is no longer practicable for various reasons: the effects of friction in the measuring apparatus and the mechanical inertia of the feelers change the conditions of the test, and this makes it necessary to carry out measurements at a speed of rotation which is lower than the normal working speed. Furthermore the normal types of indicating instruments are generally incapable of following these movements and thus do not give a useful indication.

The present invention overcomes these drawbacks by making use of gauges which have neither friction nor inertia, in combination either with inertia-less indicators, constituted for example by a cathode-ray oscillograph which registers the displacements in the form of curves on a screen, or, in the case of vibrations, with indicators which integrate the displacements and indicate their amplitudes. It should be noted that with the apparatus according to the invention a displacement of the order of ¼ micron can be translated into an indication of one millimetre in magnitude.

An object of this invention is therefore the provision of a system for indicating small displacements of a body in any of three coordinate axes.

A further object of this invention is the provision of a system for measuring the amount of displacement of a body along three coordinate axes.

A still further object of the invention is the provision of a system for indicating and measuring deformations due to dynamic effects or exterior stresses applied to a member in motion or to measure vibration both in direction and amplitude.

An apparatus in accordance with the present invention is essentially constituted by an electronic gauge of the capacitive type, the moving member of which has two or three degrees of freedom of movement, depending on whether it is desired to measure these displacements in a plane or in space. The apparatus also includes amplifying equipment and one or a number of indicators.

The gauge utilises the variations of double capacitors, each of which is constituted by a moving electrode displaceable between two fixed electrodes. In this type of gauge, the measurement is effected, not by the value of a capacity but by the ratio of two capacities. Any displacement of the moving electrode in a plane transverse to the axis along which the measurement is effected, does not modify the ratio of the two capacities since it has the same effect on both; it does not therefore give rise to any reading errors.

In accordance with an essential feature of the invention, the fixed electrodes are supplied by alternating current, preferably at high-frequency, and the moving electrode then constitutes a capacitive potential divider, the output voltage of which gives a measurement of the displacement.

By the term "high frequency" in the present specification and claims is meant a frequency which is high compared with the mechanical frequency of the phenomena to be indicated and/or measured.

In accordance with an alternative feature of the invention, the gauge may be connected in a Wheatstone capacity bridge, the measurement of the displacement being made by means of a further displacement which restores the bridge to the condition of balance, and this feature enables automatic devices to be employed for that purpose.

In accordance with a first form of embodiment of the invention, the gauge comprises three rods at right angles to each other and rigidly coupled together, each rod carrying a moving plate arranged between two fixed plates. The rods are furthermore rigidly coupled to the member, the displacement of which is to be measured.

As has already been indicated above, the three readings obtained are independent, any displacement in a direction transverse to the axis of any one of the three rods remaining without effect on the measurement effected along the said axis. In accordance with a further alternative form, the three double capacitors may be constituted by a cube or a rectangular parallelopiped acting as the common moving electrode and being enclosed by plates which form the fixed electrodes in pairs.

These first two embodiments of the invention are particularly used for the measurement of vibration, but they may also be used during balancing operations, the moving electrode being then rigidly coupled to a floating bearing.

In accordance with a preferred form of embodiment intended for the measurement of displacements of a shaft, even rotating at high speed, the moving electrode which is common to the three double capacitors is constituted by a cylinder coupled rigidly to the shaft, the displacements of which are to be measured. The fixed electrodes are constituted on the one hand by two washers provided with a hole for the passage of the shaft, the washers facing the endplates of the cylinder and serving to measure the displacements along the axis, and by two sets of plates having a cylindrical form parallel to the lateral surface of the cylinder to the extent of less than a quarter of a circle, these sets of plates being respectively perpendicular to each other and being adapted to measure the displacement in respect of two axes at right angles to each other and perpendicular to the shaft. It will be seen that such a system does not give rise to any frictional effects nor to any mechanical inertia. Furthermore, the rotation does not effect the value of the capacitors and the device enables measurements to be made either when the part is stationary or in motion. In accordance with a preferred form of embodiment, the three double condensers which constitute the gauge are supplied with alternating current in a circuit arrangement which gives instantaneously an output potential which is proportional to the measured displacement, and this potential is then amplified. A common high-frequency generator will preferably be used for the supply of the three double capacitors, so as to avoid interference phenomena due to parasitic capacities which are inevitably present between the various electrodes, and also due to the use of similar frequencies in the three channels. Frequencies differing very widely may also be utilized, thus reducing the effects of cross-induction to very low values.

The amplifier used may comprise one or a number of high-frequency stages, and a diode may be used to transform the amplitude variations of the high-frequency current into variations of direct-current potential which controls either directly or through the medium of a direct-current amplifier, the deflection of an indicator or measuring device, such as the spot of a cathode-ray oscillograph, which enables measurements to be made at very low speeds and even when stationary. In this way, the scale of the displacements of the spot may be determined in a rapid and certain manner by making a displacement of a known amount, for example, by means of standard shims, of the moving feeler of the gauge.

The indicator is constituted, in a preferred form of embodiment, by a cathode-ray oscillograph, to the plates of which are applied the potentials which correspond to the displacements. The displacement of the spot on the screen may thus give a simultaneous measurement of the displacement in respect of two directions. With a screen having a certain persistence, the curve corresponding to the displacement can be seen, even in the case of a slow movement. In the case of measurement of the displacements of a rotating shaft, the displacements of this shaft perpendicularly to its axis may be followed in the same way. In this case, the shaft may be provided with a cam which gives a signal at every revolution, for example by varying the intensity of the spot, thus enabling the angular position of an out-of-balance of the shaft to be observed and determined.

In accordance with a further feature of the invention, the same cathode-ray oscillograph is used to give a visual representation of the displacements in three dimensions. To this end, the two plates which control the vertical deflection of the oscillograph are supplied with a potential proportional to the vertical displacement to be measured, whilst the two plates controlling the horizontal deflection of the spot are supplied with a potential which is the sum of two potentials respectively proportional to the two horizontal displacements, one potential being multiplied by the cosine of an arbitrary angle α, for example 30°, and the other by the sine of the same angle. In these conditions, an image is formed on the screen, similar to that which would be seen by an observer whose line of vision makes an angle α with the axis of the shaft, if the displacements were sufficiently large, and slow to be seen with the naked eye.

In accordance with a further alternative form of embodiment of this system, the three double capacitors are again constituted by a cube or rectangular parallelopiped associated with three pairs of plates which form the fixed electrodes. The three double capacitors are supplied with alternating current, preferably at high-frequency, from a single high-frequency generator. Different frequencies may, however, be employed for the three channels, which may include an amplifier with one or more stages of high-frequency amplification, followed by a rectifier and, if required, a direct-current amplifier stage or stages.

In this form of embodiment also, the indicator device comprises a cathode-ray oscillograph, to the deflecting plates of which are applied the potentials corresponding to the displacements in space of the cube body, the corresponding displacements of the spot on the screen thus giving an indication and/or measurement of the displacements of the body.

A visual three-dimensional representation of the said displacements may also be obtained in this case by applying the output from one pair of fixed electrodes, for example corresponding to the vertical displacement to be measured or indicated, to the deflecting plates controlling the vertical deflection of the spot, the two deflecting plates controlling the horizontal deflection being supplied by a potential which is the sum of two potentials derived respectively from the other two pairs of fixed electrodes, one potential being multiplied by the cosine of an arbitrary angle α, and the other by the sine of the same angle.

Further characteristic features and advantages of the present invention will become apparent by reference to the description which follows below of forms of embodiment of the present invention, these being given by way of example only and not in any limiting sense, reference being made to the attached drawings which shows:

In Fig. 1, the measurement of displacements with respect to three axes OX, OY, OZ, by means of double capacitors, the arrangement being shown in diagrammatic form.

In Fig. 2, also in diagrammatic form, a method of embodiment of the three double capacitors in which the common moving electrode is constituted by a cube.

In Fig. 2A, an embodiment with an open floating bearing.

In Fig. 3, a form of embodiment of the gauge for the measurement of displacements with respect to three axes, specially adapted for measuring the displacements of a shaft in rotation.

In Fig. 4, a schematic arrangement of the electrical system and connections of the electrodes of one of the gauges, such as shown in Fig. 3.

In Fig. 5, a schematic arrangement of the combination of the device shown in Fig. 3 for the measurement of displacements with respect to the two axes OY, OZ, perpendicular to the shaft, with a cathode-ray oscillograph used as the indicator.

In Fig. 6, a schematic arrangement of the connection diagram for the device of Fig. 3, using a cathode-ray oscillograph to give a visual representation of the displacement, with respect to three dimensions, of a rotating shaft.

Figure 7:
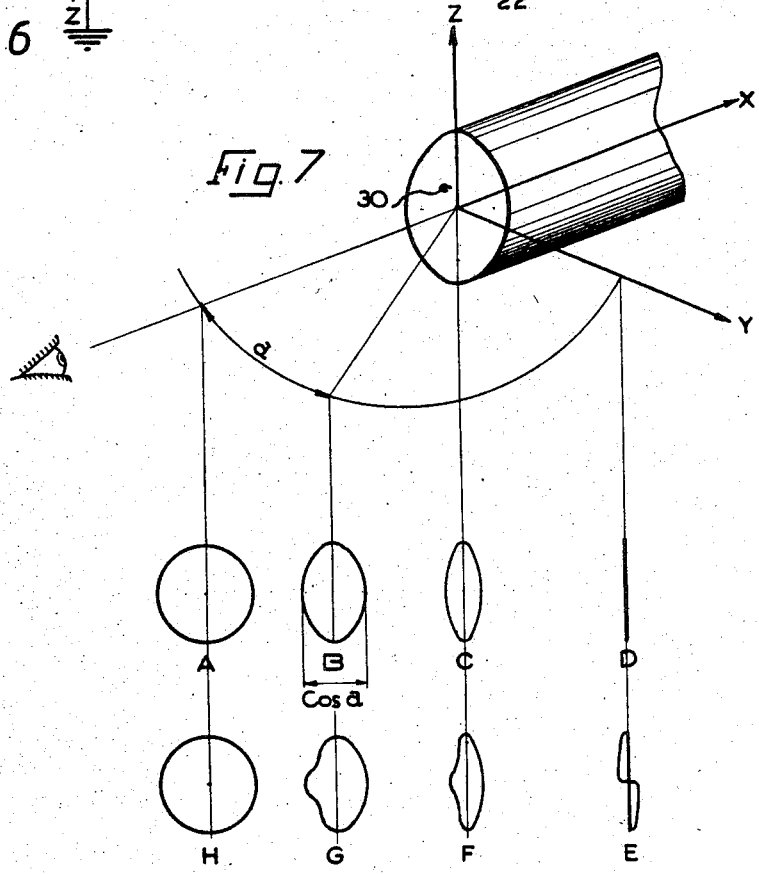

In Fig. 7, the aspect of the curves corresponding to a certain displacement in space of the rotating shaft.

In Fig. 8, a diagrammatic view of an arrangement enabling the orientation of the curve traced on the oscillograph screen to be observed with respect to a physical point of the rotating shaft.

Figure 9:
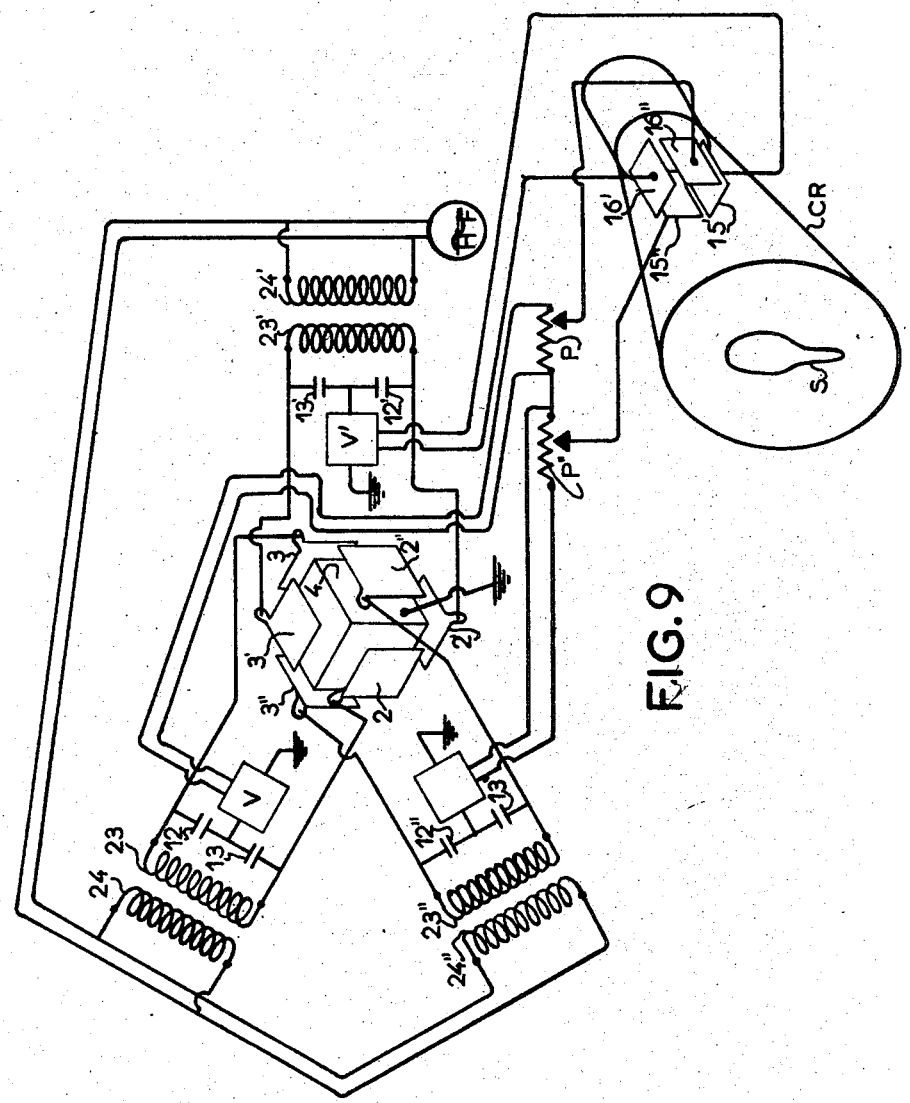

In Fig. 9, a generalised connection diagram showing the application of the device of Fig. 2 to the visual indication and definition of the displacements of a body with respect to three co-ordinate axes corresponding to three dimensions in space.

And in Fig. 10, a diagrammatic arrangement of a further possible method of measurement of displacements by the compensation of zero method.

Fig. 1 shows a diagrammatic method of measurement of displacements of a point O in space, by means of an electronic gauge having three double capacitors. Three rods constituting the axes OX, OY, OZ, are rigidly coupled to the point O, the displacement of which is to be measured, thereby forming a rigid system in the form of a triple-rectangle trihedron. On each of these axes and perpendicular thereto, there is fixed a moving electrode 1, 1′, 1″, adapted to move between the fixed electrodes 2, 3; 2′, 3′; 2″, 3″ and thus constituting three double condensers. It will be noted that the readings given by the gauges will each depend on the ratio of the capacities, such as 1–2 and 1–3, and that this ratio is not affected by the sliding of the moving electrode 1 in the directions of either of the two other axes OY, and OZ, so that the measurements of the displacements with respect to the three axes are quite independent, on condition that no rotation is permitted.

Fig. 2 shows a form of embodiment of a triple gauge which is suitable for the measurement of vibrations of mechanical parts such as machine frames in which rotation can be neglected. A cube or a rectangular parallelopiped 4 is elastically mounted inside a casing formed by three pairs of fixed plates 2, 3; 2′, 3′; 2″, 3″; which are mechanically coupled to each other and fixed to the frame to be measured, but electrically insulated from each other. The solid central body which forms the common electrode is connected to earth through a flexible wire, a necessary and sufficient dielectric space being provided between the common electrode and the external plates.

It is clear that the fixed plates do not require to have a surface corresponding to the whole surface of the parallelopiped and may be provided with spaces, if necessary, to give access to the central electrode, in the case for example in which the latter is being used as a bearing. The relative arrangements of the various members may be modified in accordance with the requirements of mounting and space occupied. For example, in Fig. 2A, there is employed a hinged bearing 30 resting on a base 31 through the medium of four elastic supports 32 intended for measurements in one plane. The electrodes 3', 2' for the axis OX, are arranged in exactly the same manner as that shown in Fig. 1, the plate 1' being rigidly coupled to the bearing 30, whilst the electrodes 3", 2" for the axis OZ are arranged in accordance with Fig. 2.

Fig. 3 illustrates a further form of embodiment of a triple gauge adapted for the measurement of the displacements of a rotating shaft 6. This shaft may move along the axes OY, OZ, as a result of bending stresses or dynamic stresses resulting from an out-of-balance; in addition, it may oscillate along the axis OX. In this form of embodiment, the moving common electrode of the triple gauge is constituted by a cylinder 7 keyed to the shaft 6. The periphery of the cylinder 7 is surrounded by two pairs of plates 2', 3'; 2", 3", each of which is given a curved shape so that it is parallel to the periphery of the cylinder 7, the plates being respectively perpendicular to the axes OY, OZ. Each of these pairs of plates forms, with the cylinder 7, a double condenser. If the plates are sufficiently narrow and the dielectric space is adequate, the effect of the curvature of the plates and of the cylindrical surface may be neglected, and experience has shown that if the cylinder 7 is moved perpendicular to its axis OX, the two gauges formed respectively by the cylinder 7 and the plates 2', 3', and by the cylinder 7 and the plates 2", 3", behave exactly like flat plate gauges. In order to measure displacements with respect to the axis OX, washers 2, 3, are utilised as the fixed electrodes surrounding the shaft and combining their action with the two plane faces which close the cylinder 7 at its two extremities. The system of measurement and/or indication thus obtained is quite frictionless and enables the measurement without error of displacements of the shaft which may result from dynamic stresses. The central electrode may be formed by the shaft itself, the eccentricity of which may be measured at low speeds, this being an important error which is too often overlooked.

Fig. 4 is a diagrammatic illustration of the connection of the plates of one of the three capacitors mentioned in the preceding system, that is, the gauge enabling measurement of the vertical displacement along OZ to be made. The fixed plates 2", 3" are respectively connected at A and B to the terminals of an inductance coil 11 coupled at 11' with an oscillator which supplies the high-frequency current. To these two terminals are connected two fixed condensers 12, 13, arranged in series. The cylinder 7 is connected to earth at D; it forms with the fixed plates 2", 3", two condensers which form with the two condensers 12 and 13 a double potential divider similar to a Wheatstone bridge adjusted in such a way that it is always out-of-balance in the zone of measurement. Any displacement of the shaft 6 along the axis OZ causes a variation in the potential applied to the input of the amplifier-measuring instrument unit V, and gives a measure of displacement independently of the rotation of the shaft.

Fig. 5 shows diagrammatically how a visual representation may be obtained of the vibrations of a rotating shaft 6 with respect to the axes OY and OZ perpendicular to its axis OX, by means of the device previously described and a cathode-ray oscillograph. The cylinder 7 is always connected to earth; the fixed plates 2", 3" which serve in the measurement of the horizontal displacement along the axis OY perpendicular to the axis OX, are connected to the measuring device 14' comprising the assembly of the oscillator and the measuring bridge, as well as an amplifier, and giving at its output terminals a potential proportional to the displacement of the shaft 6, along the axis OY. This potential is applied to the horizontal deflection plates 15', 16' of a cathode-ray oscillograph. In a similar way, the plates 2", 3", which measure the displacement along the axis OZ, are connected to the assembly 14", similar to 14' and giving at its output a continuous-current potential proportional to the displacement of the shaft 6 along the axis OZ, this potential being applied to the vertical deflection plates 15", 16", of the cathode-ray oscillograph. The fact that the spot follows the displacement of the shaft may be checked when the shaft 6 is at rest and, if it has a certain flexibility, by applying pressure to the shaft with the fingers. This movement is proportional to the actual displacement and may be calibrated when the shaft is stationary. If the shaft vibrates as it rotates, the spot will follow the movements of the shaft and will trace a curve which can be conveniently observed on a screen which has a slight persistence, even in the case of slow rotational speeds. At steady speeds, the vibrations of the shaft are generally periodic, and the spot will trace out a closed, stable curve, which will enable a dynamic study of the machine to be made, for example, an out-of-balance or a balancing defect may be revealed. In order to enable the curve to be oriented with respect to the shaft, for example to determine the direction of an out-of-balance, the system may be completed as is shown in Fig. 8; a cam 18 may be mounted on the shaft 6, the cam having a nose which closes a contact 20 at every revolution. This contact may act on the Wehnelt tube of the oscillograph so as to increase the brightness of the spot; thus, at every revolution, there will be seen on the curve, a point 21 (Fig. 5) which is more brilliant, corresponding to the position of the nose of the cam 18 on the shaft 6.

Due to the effect of parasitic capacities between the fixed electrodes 2', 3' and 2", 3", there is a possibility of the production of beat frequencies between the two channels. In order to eliminate this, the frequencies of the oscillators must be chosen to be materially different, or conversely, a common oscillator is employed for both channels 14' and 14".

If, in addition to the vibrations of the shaft 6, it is desired to be able to measure its sliding movement with respect to the axis OX, there will be used a supplementary gauge (Fig. 6) constituted by the fixed electrodes 2, 3, acting in combination with the lateral faces 9, 10 of the cylinder 7 or with a shouldered portion formed on the shaft 6. This system is connected to an assembly 14, similar to the assemblies 14' and 14" of Fig. 5, which gives at its output terminals a potential proportional to the displacement along the axis OX, which could be separately read. It is, however, interesting to know, for the purpose of analysis, what is the relation between the amplitudes and the phase of the loop in the direction of the axis OX and the displacements along the axes OY and OZ.

In a preferred form of embodiment of the present invention, a single oscillograph may, however, be used in order to give a visual representation of the displacements in space of the shaft with respect to the axes OX, OY, OZ, this representation being made and readable in one plane. This may be effected by using the arrangement shown in Fig. 6. In this arrangement, it will be seen that the plates 2', 3', act, through the medium of the assembly 14' as indicated above, on the vertical deflection plates 15', 16', of the cathode-ray oscillograph. To the horizontal deflection plates 15", 16", there is applied a potential which will be the sum of the output potential of 14″ multiplied by the cosine of an arbitrary angle α, and of the output potential of the assembly 14, multiplied by the sine of the same angle. The multiplication is carried out by simply acting on the amplification of the assemblies 14 and 14″; the addition of the two potentials may be made by means of a double sine-cosine potentiometer 22, which may also be made-up by means of two linear potentiometers mechanically operated in accordance with a sine and cosine variation.

Fig. 7 shows the aspect of the curve which will be obtained with this system. It will be supposed that the centre 30 of the shaft, at the place where the measurement is carried out, describes a circular movement about the true axis of revolution in the plane OY, OZ and that, in addition, it slides along the axis OX. If, for the moment, the measurement of the displacement along OX is neglected (the amplification being reduced to zero in the assembly 14), the curves A, B, C, D, will be obtained by varying the amplification of the assembly 14″. At A, when the amplification given by 14″ is equal to that given by 14′, a circle will be obtained just as was observed in the case of the arrangement of Fig. 5. If the amplification is reduced, the curve observed becomes an ellipse which becomes more and more flattened, exactly as if the shaft were being locked at along a line making an angle α with the true axis of revolution, if the displacement in the plane OY, OZ were sufficiently large to be visible to the naked eye. When the amplification of 14″ becomes zero, which corresponds to an observation along the axis OY, the curve is reduced to a straight line D. If there is now added to the output potential of 14″ the output potential of the assembly 14 corresponding to the displacement along OX, multiplied by the sine of the angle α, the curves A, B, C, D, become the curves H, G, F, E, which correspond to the trajectory of the point 30 seen in space from an angle α. This method gives a good visual representation of the phenomenon. For a numerical study, it is preferable to use the curves H and E, the first giving the two displacements with respect to OY and OZ, and the second giving the displacements with respect to OX and OZ.

The embodiment shown in Fig. 9 is an amplified form of the diagrammatic system shown in Fig. 6, but comprising in this case the type of double capacity device shown in Fig. 2. Each of the three double capacitors 2, 4, 3; 2′, 4, 3′; 2″, 4, 3″ are supplied with alternating current, preferably at high-frequency, by means of inductance coils 23, 23′, 23″, coupled to inductances 24, 24′, 24″, connected to a high-frequency generator HF. Different frequencies may, however, be employed in the three channels. The common points of the pairs of series condensers 12, 13; 12′, 13′; 12″, 13″, are connected to the units V, V′, V″, which may each respectively comprise a single or multi-stage high-frequency amplifier, a detector, a direct-current amplifier and a measuring instrument.

The apparatus V′, associated with the fixed electrodes 2′, 3′ is connected to the vertical deflecting plates 15′, 16′ of a cathode-ray oscillograph CR shown schematically in dotted outline. The outputs from the channels V, V″, are combined and applied across the horizontal deflecting plates 15″, 16″, the combination of said outputs being effected by means of potentiometers P, P″, the sliders of which are respectively connected to the plates 15″, 16″.

By this means, the potential applied between the plates 15″, 16″ is the sum of two potentials, of which one is the potential derived from channel V multiplied by the cosine of an arbitrary angle α, e.g. 30°, the other being the potential derived from channel V″ multiplied by sin α. By this expedient, the location at any instant of the spot S on the screen of the tube CR defines the instantaneous position of a point on the body 4 with respect to three rectangular co-ordinate axes corresponding to three dimensions in space.

Fig. 10 illustrates diagrammatically a further application of the apparatus. This consists in causing a circular electrode 7′ to rotate in synchronism with a member 7 which is to be balanced, the electrode 7′ being mechanically balanced but having an electro-static asymmetry, which may easily be obtained by means of a cylinder mounted eccentrically on the shaft 6′, the out-of-balance mass being eliminated by machining-off portions, in accordance with standard practice.

Around this circular electrode 7′, there are mounted four electrodes 32′, 33′; 32″, 33″, mechanically coupled to each other but electrically insulated. The assembly forms an arrangement similar to the measuring device previously described.

In addition, means are provided for causing these four supplementary electrodes to be rotated angularly, as shown by the arrow F, and also to cause them to slide in the axial direction indicated by the arrow F′, so as to cause the active surface of the electrodes corresponding to the part placed opposite the central electrode to vary. There is thus also available means for creating a fictitious out-of-balance, the angular position and the absolute value of which can be modified at will following a known scale.

If now the two measuring devices are placed in parallel, one indicating the real out-of-balance, the other the fictitious out-of-balance, the algebraic sum of the displacements can be read and this sum can then be brought to zero by displacing longitudinally and angularly the supplementary electrodes.

There is also an exact method of reading by the zero method the angular values and the position of the displacements of the part to be balanced. The zero reading may be effected not only by means of an oscillograph, as has been indicated above, but also by utilising standard methods of integration or of opposition.

For example, by separately integrating the alternating currents resulting, on the one hand, from the real out-of-balance and, on the other hand, from the fictitious out-of-balance, and then by making equal the values of the two corresponding average currents by longitudinal displacement of the electrode, the value of the out-of-balance is obtained in magnitude but not in direction. The two values of alternating currents which are now equal are brought into phase-opposition, this time without integration, by rotation of the electrodes, which gives the angular position of the out-of-balance.

The longitudinal and circular displacements may be carried out automatically and may be controlled by passing to the point of balance, the two measurements referred to being effected by the zero method.

One, two or three channels for the axes OX, OY, OZ, may be utilised, either grouped together, or separately when the measurements made on one single plane are found to be sufficient. By using the same gauge but connecting the opposite external electrodes to each other, the sum of two capacities may also be measured instead of a ratio of capacities, and there may also be determined by this means the variations in the diameter of a rotating member which is subjected to a deformation due, for example, to centrifugal forces, or a sliding member subjected to an internal pressure resulting, for example, from the combustion of a powder, without contact with this member and with comparative independence of its position.

In the case of measurements made on members in rotation, a slow speed of rotation enables measurements of eccentricities to be made in the absence of dynamic stresses; this measurement may also be made, but with a less degree of precision, by the use of one only of the capacities of each group of two.

The absence of mechanical inertia and the rapidity of response of the electronic circuits enable correct readings to be obtained, even when the measurement is only effected over a fraction of a turn.

In particular, in the case in which the moving electrode is a rotating cylinder, the latter may have its external surface broken. For example, in the case of a turbine rotor, if care has been taken to provide the housing of four electrodes in the stator so as to face four blades, the play at the tips of the blades and the uniformity of their spacing and their eccentricities may all be measured by utilising one, two or four electrodes, as previously indicated. Also, with the rotor running at high speed, the resulting dynamic deformations may also be measured and/or indicated.

What is claimed is:

1. An apparatus enabling the path of movement of a point on a rotating member to be defined with respect to a system of three orthogonal co-ordinate axes, comprising in combination, a closed cylinder mounted on said member and having a conducting surface connected to ground and conducting ends connected to ground; two pairs of fixed insulated arcuate electrodes capacitively associated with said conducting surface so that each of two of said co-ordinate axes is normal to one of said arcuate pairs; one pair of fixed insulated disc-shaped electrodes capacitively associated with the ends of said cylinder; a cathode-ray oscillograph provided with a pair of vertical deflecting plates and a pair of horizontal deflecting plates; a first channel circuit connected to one pair of said arcuate electrodes; a second channel circuit connected to the other pair of arcuate electrodes; a third channel circuit connected to the pair of disc electrodes; an amplifier-detector unit interposed in each channel; means connected to ground for applying high-frequency potential to each pair of fixed electrodes; means for connecting the amplifier-detector unit of first said channel to one pair of said deflecting plates; potentiometer means for combining the outputs from the amplifier-detector units of said second and third channels and for applying said combined potential to the other pair of deflecting plates, said combined potential being the algebraic sum of two potentials of which one is the output from one of the said combined channels multiplied by the cosine of an arbitrary angle, the other potential being the output from the other combined channel multiplied by the sine of the same angle.

2. Apparatus for determining small displacements of a body with respect to three coordinate axes passing therethrough, said body having an electrically conductive surface and a constant electric potential, comprising three pairs of fixed electrodes arranged in opposed spaced relation to said body and so that each pair is in alignment with one of said coordinate axes, respectively, to thereby form three variable double capacitors, the movable electrode of which is constituted by said body, means for supplying constant alternating voltage to each pair of fixed electrodes, and means for indicating changes in voltage between said surface of the body and said fixed electrodes as said body moves toward and from the same in which said body and said means for supplying constant alternating voltage to each pair of fixed electrodes are connected to ground, and said indicating means comprise a cathode-ray tube having two pairs of beam-deflecting plates, three amplifiers, a first circuit connecting one of said three pairs of fixed electrodes through one of said amplifiers with one of said two pairs of beam-deflecting plates, a second circuit connecting a second pair of fixed electrodes to the input of a second amplifier, a third circuit connecting the third pair of fixed electrodes to the input of the third amplifier, and circuit means connecting the output of the second and of the third amplifier with the other pair of beam-deflecting plates, said circuit means including means to apply to the output voltages of said second and third amplifiers a coefficient corresponding to the cosine and sine, respectively, of an arbitrary angle.

3. An apparatus as claimed in claim 2, in which the said body is a shaft, further comprising a cam mounted on said shaft, a contact operated by said cam once per revolution of said shaft, and means actuated by said contact for increasing the brightness of the spot of said cathode ray tube, whereby the curve traced on the screen by said spot may be oriented with respect to said shaft.

4. Apparatus for determining small displacements of a body with respect to three cordinate axes passing therethrough, said body having an electrically conductive surface comprising three pairs of fixed electrodes arranged in opposed spaced relation to said body and so that each pair is in alignment with one of said coordinate axes, respectively, to thereby form three variable double capacitors, the movable electrode of which is constituted by said body, means for supplying constant alternating voltage across each pair of fixed electrodes, and means connected between said body and an intermediate voltage point of said supply voltage for indicating changes in voltage between said surface of the body and each of said fixed electrodes as said body moves toward and from the same, said body being at a fixed potential point with respect to the supply voltage.

5. An apparatus as claimed in claim 4, in which the said body has the form of a rectangular parallelopiped having six conducting surfaces, each surface being in capacitive relation with a fixed insulated electrode spaced apart from and parallel to said surface, thus forming three double condensers, the ratio of capacity of which is varied by displacements of said body having a component perpendicular to the fixed electrodes of each double condenser.

6. An apparatus as claimed in claim 4, in which the said body has the shape of a closed cylinder having a conducting surface and conducting ends, two of said pairs of fixed electrodes being constituted by curvilinear plates, the plates of one of said two pairs being normal to one diametral axis of said cylinder and constituting one co-ordinate axis, and the plates of the other of said two pairs being normal to a diametral axis at right angles to the first and constituting a second co-ordinate axis, the remaining third pair of fixed electrodes being constituted by discs spaced apart from and parallel to the ends of said cylindrical body, the axis of which constitutes the third co-ordinate axis.

References Cited in the file of this patent

UNITED STATES PATENTS

| | | |
|---|---|---|
| 2,025,719 | Blau et al. | Dec. 31, 1935 |
| 2,338,732 | Nosker | Jan. 11, 1944 |
| 2,371,040 | Fisher et al. | Mar. 6, 1945 |
| 2,377,212 | Cottrel | May 29, 1945 |
| 2,542,018 | Ferrill | Feb. 20, 1951 |
| 2,604,512 | Bacon et al. | July 22, 1952 |